United States Patent [19]
Kurlander

[11] Patent Number: 6,069,622
[45] Date of Patent: May 30, 2000

[54] METHOD AND SYSTEM FOR GENERATING COMIC PANELS

[75] Inventor: David J. Kurlander, Bellevue, Wash.

[73] Assignee: Microsoft Corporation, Redmond, Wash.

[21] Appl. No.: 08/612,560

[22] Filed: Mar. 8, 1996

[51] Int. Cl.⁷ .................................................. C06F 15/00
[52] U.S. Cl. ......................................... 345/330; 345/346
[58] Field of Search .................................. 345/326, 327, 345/328, 329, 330, 340, 341, 342, 351, 348, 331–332, 333, 334, 335, 336, 337, 338, 339, 343, 349, 345, 346, 347, 350, 352, 117

[56] References Cited

U.S. PATENT DOCUMENTS

| | | | |
|---|---|---|---|
| 5,544,305 | 8/1996 | Ohmaye et al. | 345/47 |
| 5,664,087 | 9/1997 | Tani et al. | 345/473 |
| 5,689,618 | 11/1997 | Gasper et al. | 395/2.85 |
| 5,697,789 | 12/1997 | Sameth et al. | 434/157 |
| 5,748,731 | 5/1998 | Shepherd | 380/4 |
| 5,758,079 | 5/1998 | Ludwig et al. | 395/200.34 |
| 5,790,122 | 8/1998 | Cecchini et al. | 345/357 |
| 5,796,945 | 8/1998 | Tarbella | 395/200.9 |
| 5,880,731 | 3/1999 | Liles et al. | 345/349 |
| 5,923,337 | 7/1999 | Yamamoto | 345/473 |

OTHER PUBLICATIONS

Chip Morningstar et al., "The Lessons of Lucasfilm's Habitat," *Cyberspace:First Steps,* MIT Press, pp. 273–301, 1991.
David Kurlander et al., "A History of Editable Graphical Histories," *Watch What I Do Programming By Demonstration,* MIT Press, pp. 405–413, 1993.
Cassell, Justine et al., "Animated Conversation:Rule–based Generation of Facial Expression, Gesture & Spoken Intonation for Multiple Conversational Agents," Computer Graphics Proceedings, Annual Conference Series, ACM Press & Addison–Wesley, pp. 413–420, 1994.

*Primary Examiner*—Steven Sax
*Attorney, Agent, or Firm*—Christensen, O'Connor Johnson & Kindness PLLC

[57] ABSTRACT

A comic generation system controls the generation of comic panels. A comic panel is a graphical representation of an instance in time of a sequential course of events. Each graphical representation typically includes a graphical representation of at least one character. The character has gestures that reflect a body pose and expressions that reflect a facial pose. Moreover, the character may have text associated with it (i.e., the character "speaks"), which is displayed in the comic panel within a bounded area called a "balloon." The comic generation system receives an interaction event and generates a comic panel. Examples of interaction events include text input by a user and selection of gestures and expressions by a user. When the interaction event provides text, the comic generation system automatically searches the text to identify any words or phrases that give rise to gestures and expressions for the character representing the user who provided the interaction event. Moreover, the comic generation system searches the text for trigger words that indicate alterations to the comic panel. The comic generation system generates the comic panel based on the results of its searches. The comic generation system also determines which characters to place in a comic panel, the positions of the characters, and the orientations of the characters. The comic generation system additionally determines the placement of balloons containing text. Also, the comic generation system determines when to generate a new comic panel and when to modify a comic panel that has already been generated. Furthermore, the comic generation system maintains a graphical history of the comic panels.

38 Claims, 12 Drawing Sheets

METHOD AND SYSTEM FOR GENERATING COMIC PANELS

TECHNICAL FIELD

The present invention relates generally to data processing systems, and, more particularly, to generating comic panels.

BACKGROUND OF THE INVENTION

Many computer users are using their computer systems to communicate with each other in chat sessions. Each user participating in a chat session transmits messages containing text to all other users. The computer system of each chat session participant displays the transmitted messages from other participants on a display screen. In some conventional systems, each user participating in the chat session is represented by a graphical representation (i.e., a character). Examples of a character are graphical representations of a woman or of a man. A user often selects a character that provides an indication of the user's personality. In addition, each character may be capable of exhibiting gestures and expressions that reflect the emotions of the user represented by the character. As used in this context, a "gesture" refers to a character's body pose, and an "expression" refers to a character's facial pose. Some conventional computer systems enable users to select gestures and expressions for characters.

Some conventional computer systems allow more than one user's character to be displayed on a display screen simultaneously. Typically, users can place their characters on different portions of the display screen. It is possible that users at different computer systems place their characters on the same portion of the display screen simultaneously. In this case, the characters are displayed overlapping each other. The user typically is responsible for positioning the character on the display screen so that the character is not displayed overlapping another character.

The text of a message is typically displayed on the display device. Some conventional systems place this text in a window that has a scroll bar. A user can scroll through the text in this window using the scroll bar. Other conventional systems display the text above the characters on the display device. Yet other conventional systems display the text in a "balloon." The text of a message is often displayed in a bounded area with a border, called a "balloon." For example, a balloon may take on the form of an oval. The balloon has a balloon body that contains the text and a balloon tail that indicates which character is "speaking" the text.

In one conventional computer system, when a character speaks, the computer system displays the character on the display screen. The system also adds a balloon for encapsulating the text of the character's speech. Each time that a character speaks, a new balloon appears that encapsulates this text, and this new balloon replaces the previous balloon for that character. In another conventional system, when a character speaks, a balloon is displayed for that character. As additional characters speak, balloons are generated for their text. However, only the tail of the most recently generated balloon is displayed. That is, for each character that speaks, the tail is removed from the balloon last added to the display device, the bodies of previous balloons appearing on the display are scrolled upwards, and a new balloon is added. The body of the new balloon is displayed on the display screen vertically above the (character that spoke and below the other balloon bodies. In this conventional system, when a character is moved, its balloon remains in its original place. Therefore, when a character is moved, it may not be possible to determine which text a particular character spoke. Moreover, in this conventional system, users cannot scroll through the balloons. Therefore, when text is scrolled off of the display screen, the user cannot view it later.

The participation of users in chat sessions may be interrupted by the users having to perform other tasks. To enable users to view a "history" of the discussion for the period the user was not participating in the chat session, some computer systems store the text of the conversation. A user can then view the text to review the discussion that the user missed. However, because the text alone often does not indicate the personality, the emotions, or the actions of a user, a history containing only the text may be inadequate in aiding a user to gain a complete picture of the chat session. In some conventional computer systems, the history provides a graphical representation of a course of events. In particular, one computer system provides a history of the actions performed by an application program by displaying graphical representations of a display screen for instances in time during the execution of the application program. For example, the history provides a graphical representation of the display screen prior to an action performed by the application program, and the history shows another graphical representation of the display screen just after the action was performed by the application program. However, this history provides the output of only a single application program executing at a single computer system.

SUMMARY OF THE INVENTION

In accordance with a first aspect of the present invention, a method is practiced in a data processing system having a display device. The data processing system is connected to at least one other data processing system. In accordance with this method, a plurality of comic panels are provided that represent a sequential course of events. Each comic panel provides a graphical representation of an instance in time of the sequential course of events. In addition, each graphical representation includes a graphical representation of at least one character. Moreover, an interaction event is received that indicates a modification of a comic panel. A comic panel reflecting the interaction event is automatically generated at the data processing system. Then the generated comic panel is displayed on the display device at the data processing system.

In accordance with a second aspect of the present invention, a method is practiced in a data processing system having a display device. The data processing system is connected to at least one other data processing system. In accordance with this method, at least one comic panel is provided. The comic panel provides a graphical representation of an instance in time of a sequential course of events. The graphical representation includes a graphical representation of at least one character that represents a user of one of the data processing systems. A current comic panel is displayed on the display device at each data processing system. The current comic panel represents a most recent event relative to each other event in the sequential course of events. An interaction is received that indicates a modification of a comic panel. After the interaction event is received, it is determined whether to generate a new comic panel incorporating the modification indicated by the interaction event. Upon determining to generate a new comic panel, a new comic panel is generated incorporating the modification indicated by the interaction event. However, upon determining to not generate a new comic panel, the current comic panel is modified to incorporate the modification indicated by the interaction event. In either case, the comic panel incorporating the modification indicated by the interaction event is displayed at the data processing system.

In accordance with an additional aspect of the present invention, a method is practiced in a data processing system having a display device. It is determined with the data processing system that a new comic panel is to be generated. The comic panel provides a graphical representation of an instance in time of a sequential course of events. Each graphical representation includes a graphical representation of at least one character. Upon determining that a new comic panel is to be generated, the characters that are to be displayed in the new comic panel are determined. Then, a placement for each character in the new comic panel is determined, where the placement indicates a sequential position of a character relative to each other character in the comic panel. Next, a new orientation for each character relative to each other character is determined. Then the new comic panel is generated, and the generated new comic panel is displayed on the display device at the data processing system.

In accordance with another aspect of the present invention, a method is practiced in a data processing system having a display. A comic panel that provides a graphical representation of an instance in time of a sequential course of events is provided. The graphical representation includes a graphical representation of at least one character. Textual input is received for a character. The received textual input is placed within a balloon having a balloon outline. The balloon outline includes a balloon body containing the textual input and a balloon tail indicating the character to which the textual input corresponds. A position of the balloon containing the textual input is determined in the comic panel, where the balloon does not interfere with the display of any balloon already positioned in the comic panel. Then the balloon containing the textual input is displayed in the comic panel on the display device at the data processing system.

In accordance with yet another aspect of the present invention, a method is practiced in a data processing system having a display device. A plurality of comic panels are provided. The plurality of comic panels represent a sequential course of events. Each of the comic panels provides a graphical representation of an instance in time of the sequential course of events. Each graphical representation includes a graphical representation of at least one character. A scroll bar displayed on the display device is provided for scrolling through the plurality of comic panels. The scroll bar includes a scroll box having a position in the scroll bar, where the position corresponds to one of the plurality of comic panels. A current comic panel is displayed on the display device at each data processing system. The current comic panel represents a most recent event relative to each other event in the sequential course of events. The scroll box on the scroll bar has a current position corresponding to the current comic panel. An indication is received from a user to reposition the scroll box in the scroll bar. A comic panel different from the previous comic panel is displayed on the display device after the indication to reposition the scroll box in the scroll bar is received.

In yet a further aspect of the present invention, a method is practiced in a data processing system having a display device. An interaction event is received. A comic panel is automatically generated based on the received interaction event. The comic panel provides a graphical representation of an instance of time during a sequential course of events. The generated comic panel is displayed on the display device.

In accordance with another aspect of the present invention, a data processing system includes a display device. The data processing system also includes a comic generation system for generating comic panels. Each comic panel provides a graphical representation of an instance in time of a sequential course of events. Each graphical representation includes a graphical representation of at least one character. The comic generation system includes a receiver for receiving an interaction event indicating a modification of a comic panel. The comic generation system also includes a generator for generating a comic panel incorporating the interaction event received by the receiver. Moreover, the comic generation system includes a displayer for displaying the comic panel generated by the generator.

In yet another aspect of the present invention, a first data processing system connected to a second data processing system includes a display device. The first data processing system also includes a comic generation system for generating comic panels. Each comic panel provides a graphical representation of an instance in time of a sequential course of events. Each graphical representation includes a graphical representation of at least one character that represents a user of one of the data processing systems. The comic generation system includes a receiver for receiving an interaction event from a user indicating a modification of a comic panel. The comic generation system also includes a generator for generating a new comic panel incorporating the interaction event received by the receiver. Moreover, the comic generation system includes a displayer for displaying the new comic panel generated by the generator at the first data processing system.

In accordance with a further aspect of the present invention, a data processing system includes a display device, a server application program, and a client application program. An interaction event is received at the server application program from the client application program. A comic panel is automatically generated with the server application program based on the received interaction event. The comic panel provides a graphical representation of an instance in time during or sequential course of events. The graphic representation also includes at least one graphical representation of a character. The generated comic panel is forwarded from the server application program to the client application program.

In accordance with another aspect of the present invention, a data processing system includes a display device, a server application program, and a client application program. The data processing system is connected to at least one other data processing system, and each connected data processing system has a client application program. Under control of the client application program of the data processing system, an interaction event is received. Then a comic panel is generated. The comic panel provides a graphical representation of an instance in time of a sequential course of events. Each graphical representation includes a graphical representation of at least one character. Next, the generated comic panel is displayed at the data processing system. Moreover, the received interaction event is forwarded to the server application program. In addition, the server application program forwards the received interaction event to each other client application program at each connected data processing system.

In accordance with yet a further aspect of the present invention, a computer-readable storage medium, upon which is stored a comic generation program for automatically generating comic panels is provided. The comic generation program displays at least one comic panel. The comic panel provides a graphical representation of an instance in time of a sequential course of events. The comic generation program receives an interaction event indicating a modification of one of the comic panels. Then, the comic generation program generates a comic panel based on the received interaction event. The comic generation program then displays the generated comic panel on the display device.

DETAILED DESCRIPTION OF THE INVENTION

The preferred embodiment of the present invention provides a comic generation (CG) system for generating comic panels to represent communication between multiple characters. A user at a single computer system can generate comic panels using the CG system during a comic session. In addition, users at multiple computer systems may communicate with each other using the CG system by transmitting messages to each other through computer systems connected by a network during a chat session. Similarly, users may communicate with each other using the CG system while time-sharing. In particular, a user provides interaction events to the CG system. The interaction events include speech text, selection of gestures and expressions, and the entrance and exiting of users from the chat session. Upon receiving an interaction event, the CG system generates a comic panel or modifies a currently existing comic panel. When the interaction event provides text, the CG system searches the text to identify any words or phrases that give rise to gestures and expressions for the character speaking the text. Moreover, the CG system searches the text for trigger words that indicate alterations to the comic panel. The CG system also automatically determines which characters to place in a panel, the positions of the characters, and the orientation, of the characters. The CG system additionally determines the placement of balloons containing speech text. Furthermore, the CG system maintains a graphical history of the comic panels that are generated.

Figure 1:
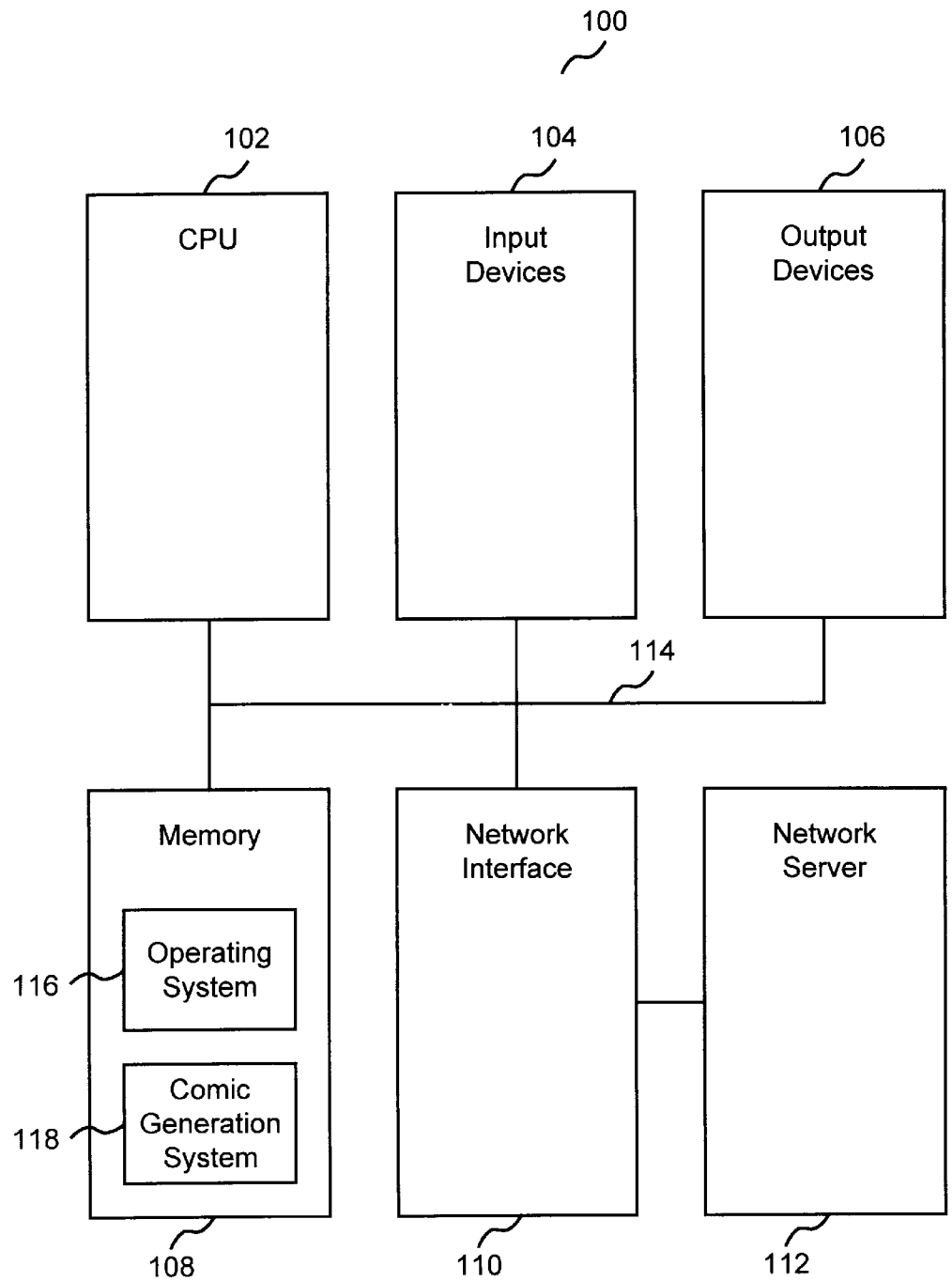
FIG. 1 is a block diagram of a data processing system which is suitable for practicing the preferred embodiment of the present invention.

FIG. 1 is a block diagram of a data processing system which is suitable for practicing the preferred embodiment of the present invention. The data processing system 100 includes a CPU 102 that is connected to input devices 104 and output devices 106. The data processing system also includes a network interface 110 connected to a network server 112 for interfacing the computer system with the network. Memory 108 stores data and code. Specifically, memory 108 holds a copy of an operating system 116, and a comic generation system 118. A connecting mechanism 114, such as a bus, connects the components of the computer system.

Figure 2:
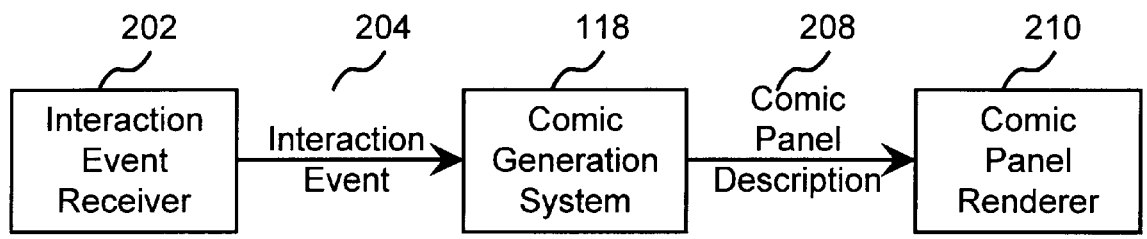
FIG. 2 illustrates the inputs and outputs to the comic generation system.

FIG. 2 illustrates the inputs and outputs to the CG system 118. An interaction event receiver 202 receives interaction events from users. One skilled in the art will recognize that the interaction event receiver can receive interaction events from another source, such as an application program. The interaction event receiver forwards the interaction event 204 to the CG system 208. The CG system generates a comic panel description 118 describing the comic panel and forwards this description to a comic panel renderer 210. The description is used to generate a bitmap of a comic panel. The comic panel renderer 210 displays the comic panel on a display device. One skilled in the art will recognize that the comic panel renderer can display the comic panel at another device, such as a printer.

Figure 3:
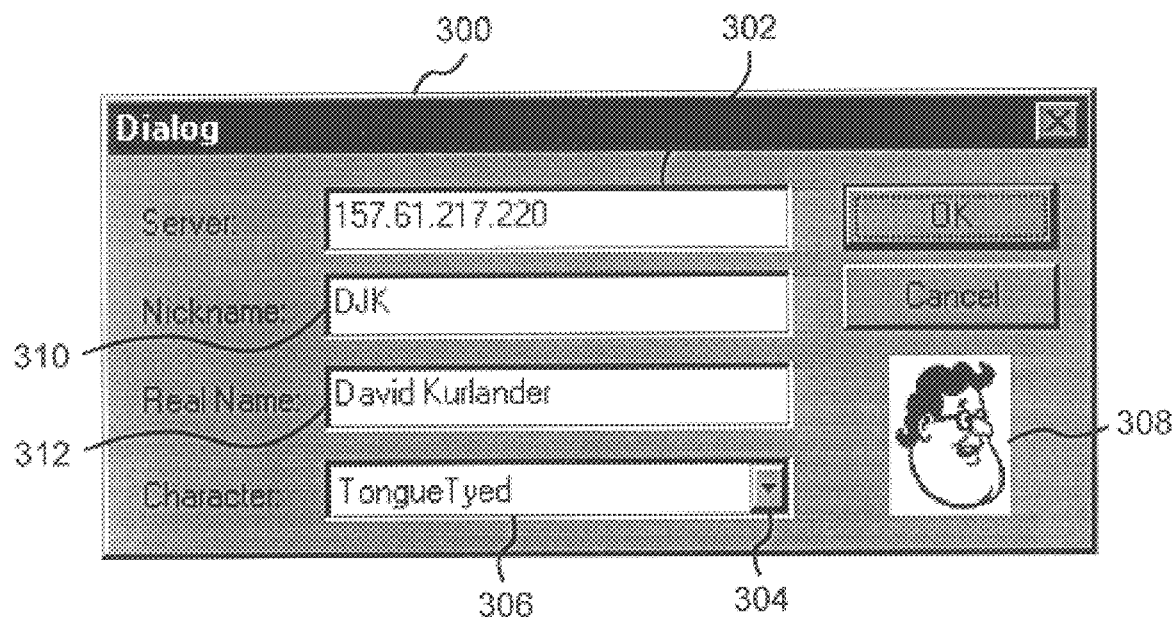
FIG. 3 illustrates a dialog box provided by the comic generation system to enable selection of a character.

Initially, when a user invokes the CG system 118, the CG system provides the user with a dialog box for selecting a character. FIG. 3 illustrates this dialog box 300. The CG system requests a user to identify a network server 302 to connect to. The CG system also requests the user to select a character. In particular, the CG system provides a list of names of characters (e.g., Tongue Tyed) for predefined characters. The list is provided with a drop-down list box 304. When a user selects a name 306, the CG system displays a bitmap 308 of the character. The user is then able to view the bitmap of the character before selecting that character. The CG system also requests the user to provide a nickname 310 for the selected character as well as the user's real name 312. When a single user is using the CG system to generate comic panels, the user can use the dialog box multiple times to select multiple characters.

Figure 4:
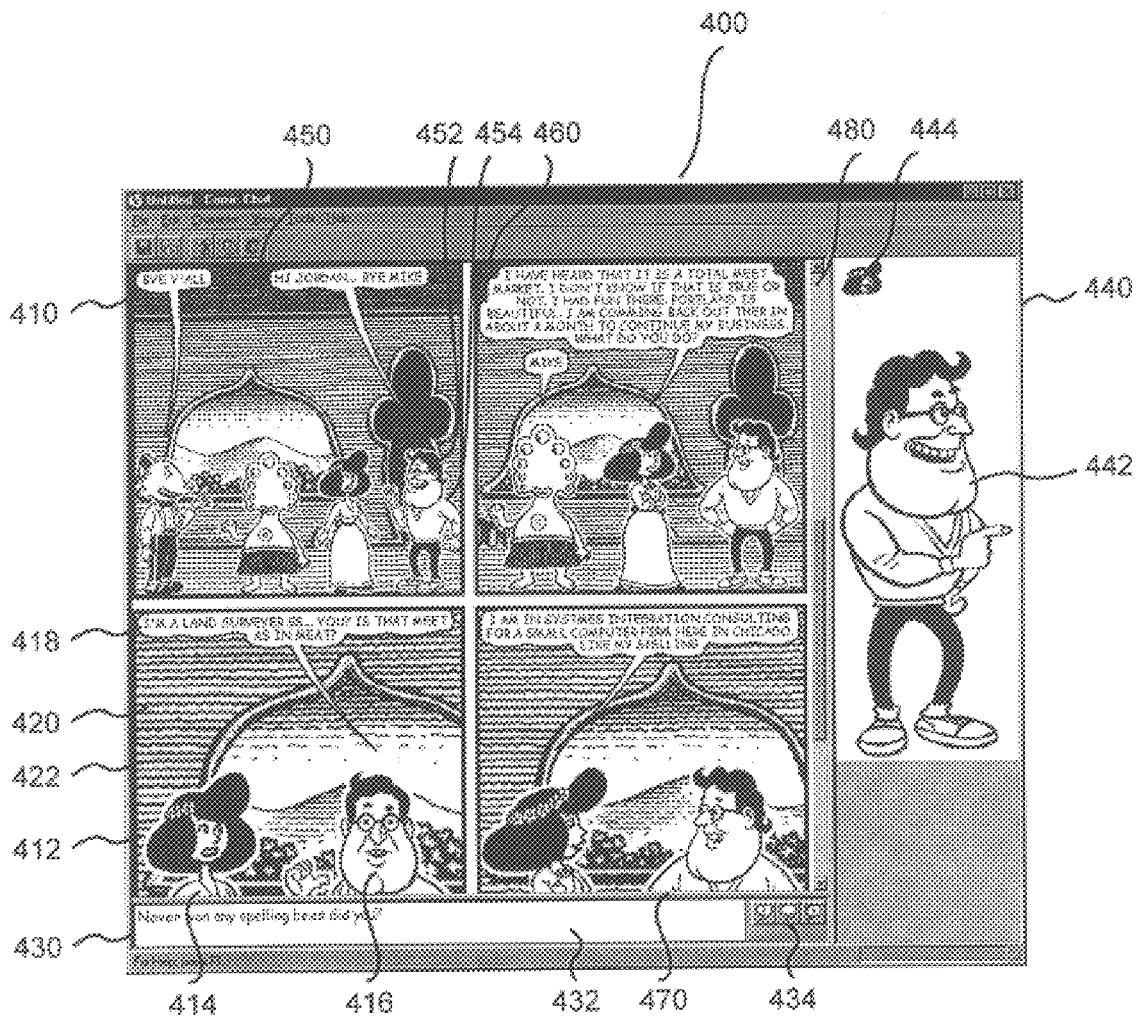
FIG. 4 illustrates a user interface provided by the comic generator system.

After the user has provided the requested user information, the CG system 118 displays a user interface for using the CG system. FIG. 4 illustrates this user interface 400. The user interface is divided into several display areas. In one display area 410, the CG system displays generated comic panels from the session. This display area 410 illustrates a sample series of four comic panels. Each comic panel contains one or more characters. For example, in comic panel 412, there are two characters, a female character 414 and a male character 416. When a character "speaks," the spoken words are placed in a balloon 418. The comic panel also has a background 420 and a panel frame 422. Although FIG. 4 illustrates comic panels that are rectangular and of equal size, one skilled in the art will recognize that the comic panels can be different shapes and sizes than those shown in FIG. 4. Moreover, the CG system provides various types of balloons including speech, thought and whisper. In one display area 430, the CG system displays text 432 entered by the user, along with buttons 434 that enable a user to select the type of balloon in which the text is to be displayed. When a user is participating in a chat session and enters text, the CG system associates the text with the character that represents the user. When a single user is using the CG system to generate comic panels, the user selects a character to associate with text that is entered using a dialog box provided by the CG system.

An additional display area 440 of the user interface contains a character 442 who is speaking the text entered by the user. The CG system generates the character with gestures and expressions as i user enters speech text. A user can alter the character that is automatically generated by the CG system. For example, the CG system automatically selects gestures and expressions for a character based on speech text and displays the character with the selected gesture and expression at only the computer system of the user represented by the character. A user can select gestures and expressions to override the ones selected by the CG system through use of a user interface such as a dialog box. When a user does so, the CG system modifies the comic panel for the user to view. Then, the user can request that the comic panel be generated. This display area 440 also displays a bitmap of the head portion of up to ten characters 444 that appear most frequently in the comic panels for the session. One skilled in the art would recognize that the use of ten characters is illustrative and that more or fewer characters can be displayed.

When users are participating in a chat session, a CG system 118 resides in a client at each user's computer system. In addition, a single comic server 112 is connected to each user's computer system through the network. When a user transmits a message that contains interaction events to the CG system, the CG system uses the message to generate a comic panel or modify an existing one. The CG system also forwards the message to the comic server. In turn, the comic server forwards the message to each other comic generation system at each other user's computer system. Then, each of these comic generation systems generates a comic panel or modifies an existing comic panel using the message. One skilled in the art would recognize that use of a single comic server is only illustrative and several comic servers can be connected to each other, with each comic generation system connected to one of the servers. Moreover, rather than having the CG system reside in the client, one skilled in the art would recognize that the CG system could reside in the comic server and the comic server could generate a comic panel for forwarding to each user's computer system. When a single user at one computer system is using the CG system to generate comic panels, the user provides interaction events to the CG system and the CG system generates a comic panel, without forwarding these interaction events to a comic server.

As discussed above, the CG system 118 provides a predetermined number of characters. Each character is represented in memory 108 by bitmaps. Each character includes a separate bitmap for its body portion and head portion. By providing separate head portions and body portions, the CG system enables expressions and gestures to be independent of each other. When displaying the character, the CG system provides a "white" outline around the body 454 (i.e., a body halo) and a "white" outline around the head 452 (i.e., a head halo) in order to distinguish the character from the background. The CG system typically displays at most five characters in each comic panel. One skilled in the art will recognize that this limit of five characters is intended solely to be illustrative, and will recognize that alternative embodiments may employ more or fewer characters per panel.

Figure 5:
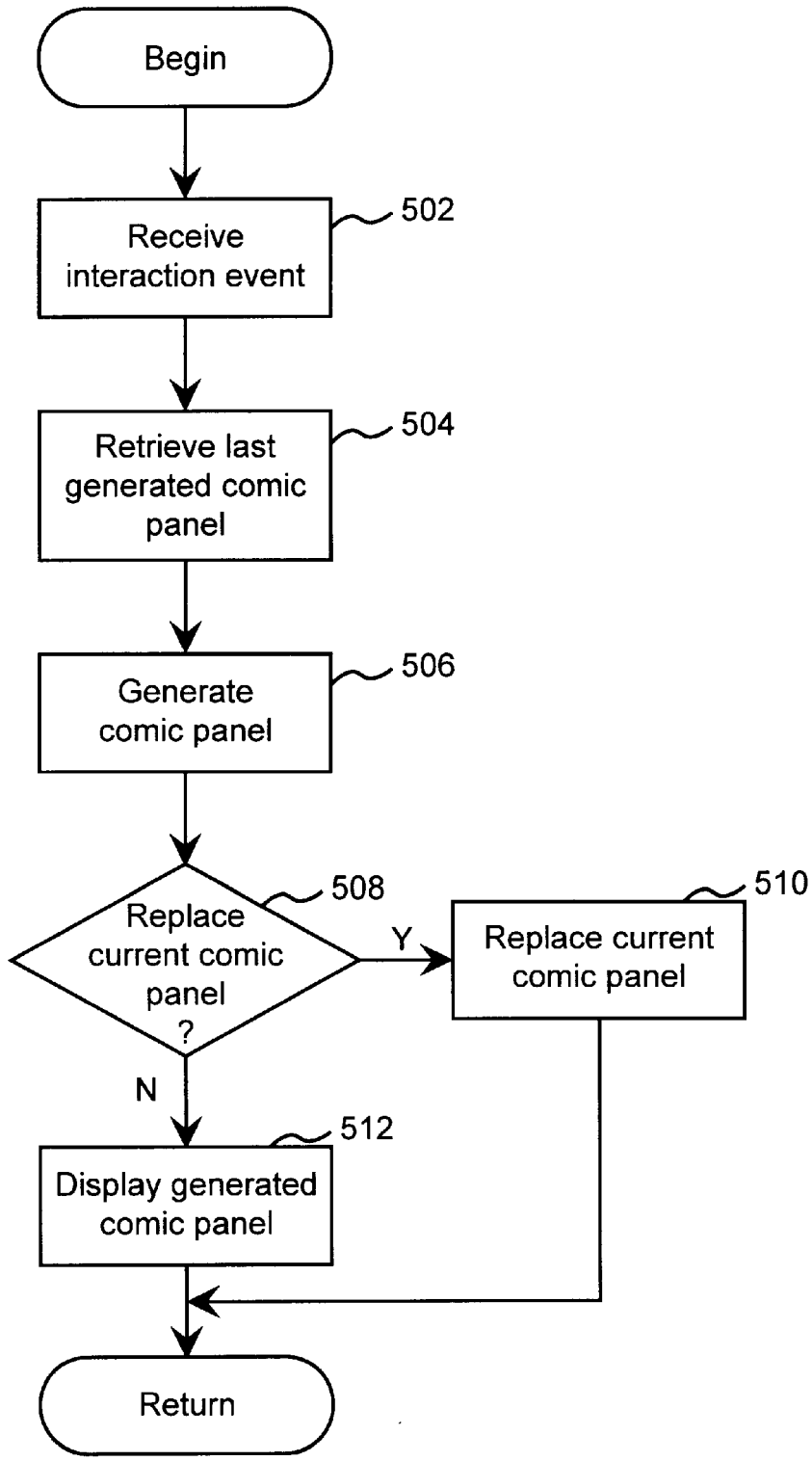
FIG. 5 is a flowchart providing an overview of the steps performed by the comic generation system to generate comic panels during a chat session.

FIG. 5 is a flowchart providing an overview of the steps performed by the CG system in generating comic panels. The CG system 118 receives an interaction event (step 502). The CG system stores a description of each comic panel it generates for a session (i.e., a chat session or a comic session). The CG system retrieves the description of the last comic panel that it generated (step 504), which is known as the current comic panel. Initially, when a user starts a session and when there are no comic panels that have been generated, the CG system skips step 504 and just generates a new comic panel. Then, the CG system generates a comic panel (step 506), which will be discussed in further detail below relative to FIG. 6.

Next, the CG system determines whether to replace the current comic panel or add a new comic panel to the display screen (step 508). The CG system typically attempts to replace a current comic panel, rather than adding a new comic panel. However, the CG system starts a new comic panel when the necessary characters (i.e., characters necessary to the comic panel, described in further detail below), do not fit into the current comic panel or when the balloons for these characters do not fit into the current comic panel. Also, the CG system does not display a character in a comic panel with more than one balloon. Therefore, the CG system starts a new comic panel when a character speaking in the current panel speaks again. Moreover, the CG system starts a new panel when modifying the current comic panel would overwrite a gesture or expression of a character in the comic panel. When the CG system is to replace the current comic panel, the CG system overwrites the current comic panel with the generated comic panel (step 510); otherwise the CG system adds the generated comic panel to the comic panels that are already displayed on the display screen (step 512).

Figure 6:
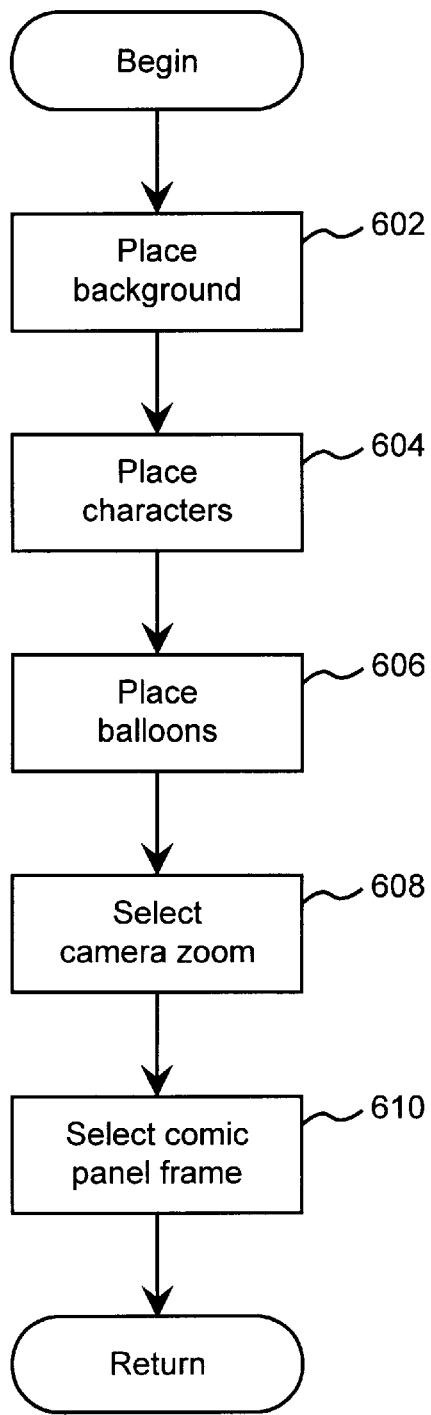
FIG. 6 is a flowchart illustrating the steps performed to generate a comic panel.
Figure 7:
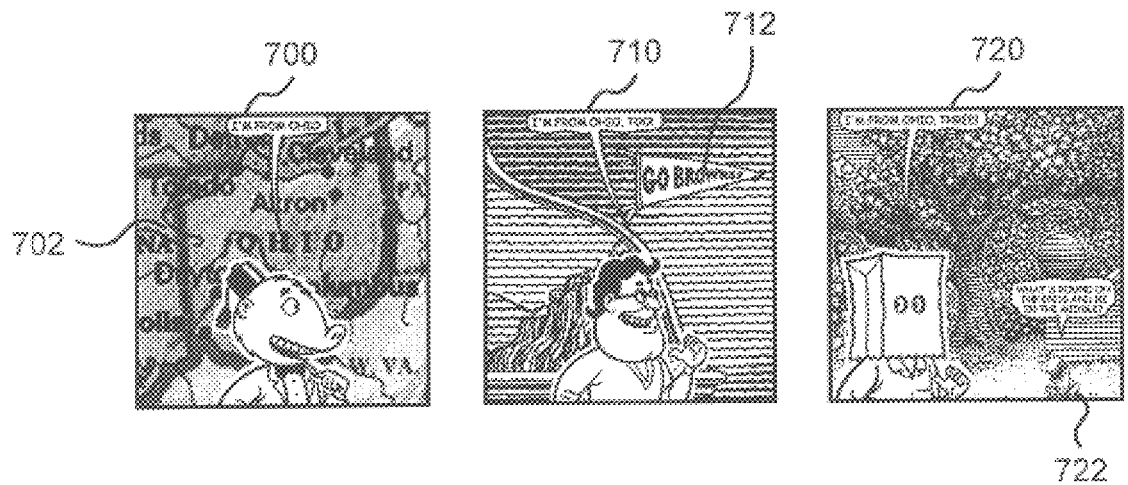
FIG. 7 illustrates three comic panels that show how the comic panel changes based upon speech text.

FIG. 6 is a flowchart illustrating the steps performed to generate a comic panel. First, the CG system places a background in a comic panel (step 602). The CG system has a set of bitmaps to use as backgrounds, and the CG system selects a particular background for the session, such as the inside of a house. When a comic server is available, the comic server can select a background. Additionally, the CG system modifies the comic panel based on the text received from users. In particular, the CG system searches the text for predefined trigger words, such as the names of states, and modifies the comic panel to reflect the semantics of the words (i.e., their contextual meanings). The modifications can include changing the background, adding an element, or adding a character to the comic panel. These modifications are called semantic elements. The CG system can typically modify the comic panel in several ways for each trigger word. To provide variety in the display of the comic panels, the CG system cycles through the possible modifications as the same trigger word is encountered multiple times. FIG. 7 illustrates three comic panels that show different types of semantic elements. In particular, in each of the three comic panels, the male character states that he is from Ohio, and the word "Ohio" is a predefined trigger word. In comic panel 700, the CG system modifies the background 702 to show a map of Ohio. In comic panel 710, the CG system modifies the comic panel to include a "Go Browns" banner 712. In comic panel 720, the CG system modifies the comic panel to include an additional character 722 who is asking a riddle.

Figure 8:
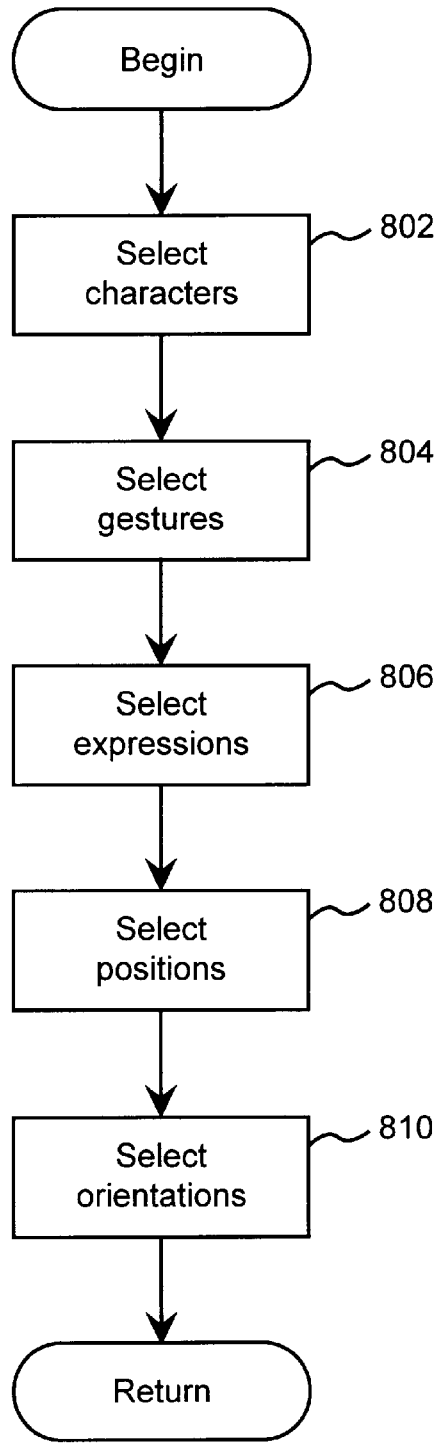
FIG. 8 is a flowchart providing an overview of the steps performed to place characters in a comic panel.

The CG system next places characters in the comic panel (step 504). FIG. 8 is a flowchart providing an overview of the steps performed to place characters in a comic panel. Each of these steps will be described in more detail below. A session may include comic panels having multiple characters. Because the CG system displays at most five characters in a comic panel, the CG system selects at most five characters to display (step 802). After selecting the characters, the CG system selects gestures for the characters (step 804). The CG system also selects expressions for the characters (step 806). Then the CG system selects the positions of the characters in the comic panel relative to each other character (step 808). Next, the CG system selects the orientations of the characters (step 810). The orientations indicate the directions which the characters face relative to each other.

Figure 9:
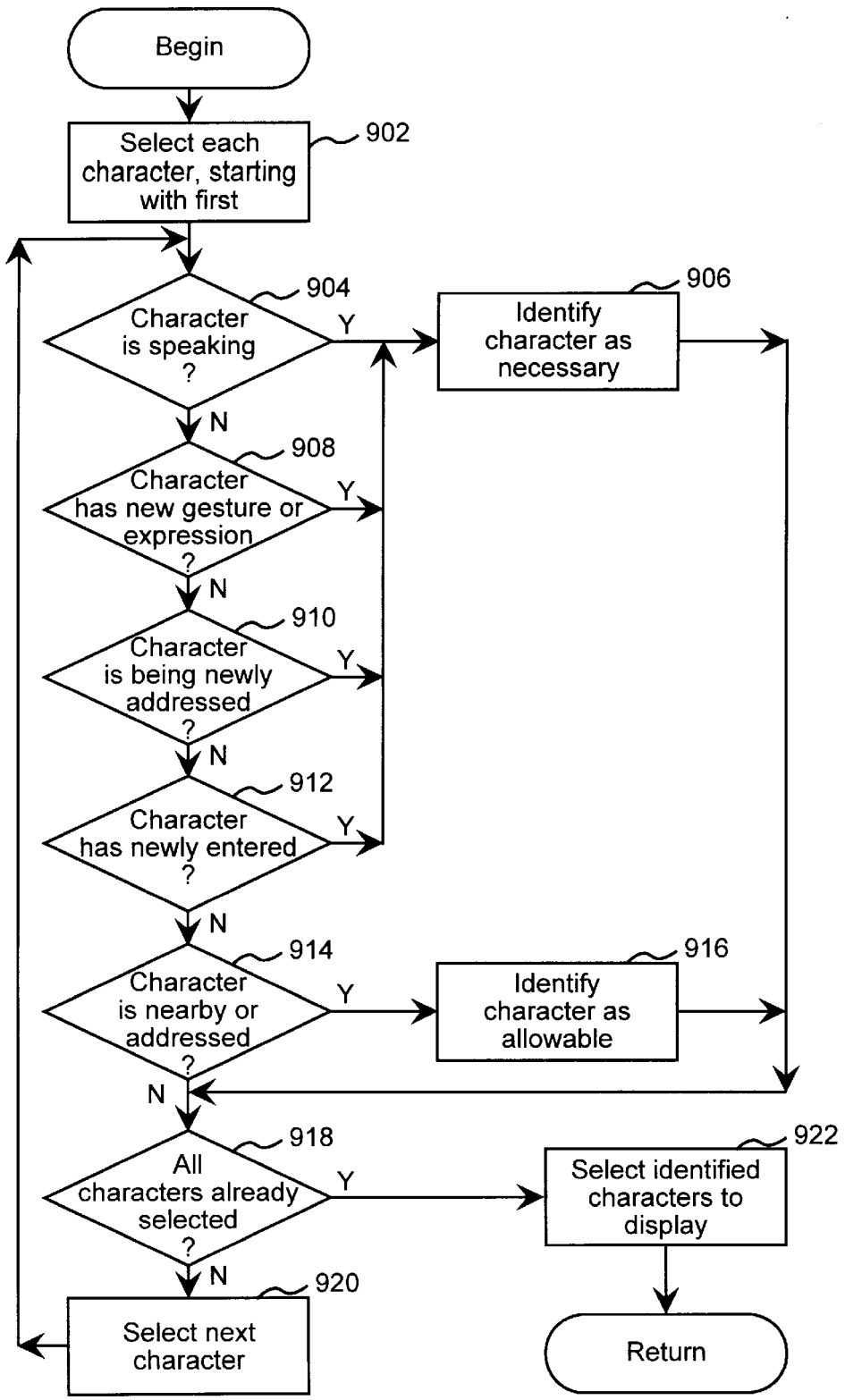
FIG. 9 is a flowchart illustrating the steps performed to select characters to place in a comic panel.

FIG. 9 is a flowchart illustrating the steps performed to select characters to place in a comic panel (see step 802 in FIG. 8). The CG system selects each character in the session, starting with the first one in a list of characters that it maintains (step 902). Characters are classified as necessary or allowed. If the character is speaking (step 904), the CG system identifies that character as necessary (step 906). When a character is identified as necessary, the CG system must place the character in the comic panel. If the character has a new gesture or expression (step 908), the CG system identifies that character as necessary (step 906). If the character is newly being addressed (step 910), the CG system identifies that character as necessary (step 906). If the character has newly entered the chat session (step 912), the CG system identifies that character as necessary (step 906). When users are participating in a chat session, by displaying a character who has entered the chat session, the CG system notifies each user participating in the chat session of the new participant. If the character was near any of the necessary characters in recent comic panels or continues to be addressed from a prior comic panel (step 914), the CG system identifies the character as allowable (step 916). An allowable character may be displayed in the comic panel, for example, when there are fewer than five necessary characters, but an allowable character is not necessary. If all characters have been selected to be identified as necessary or allowable (step 918), the CG system selects characters to display in the comic panel from among the identified characters (step 922), otherwise the CG system selects the next character to identify (step 920).

The CG system of the disclosed embodiment selects at most five of the identified characters to display in the comic panel. The characters identified as necessary take priority over characters identified as allowable. When more than five characters are found to be necessary, the CG system generates a new comic panel with only the character representing the user who provided an interaction event after the last generated comic panel was displayed. Then, each other character is added to the comic panel according to the above discussed steps. For example, in FIG. 4, in comic panel 412, the male character is identified as necessary because that character is speaking and the female character is identified as necessary because she is being newly addressed.

The CG system selects the gestures and expressions based on the text entered by a user (see steps 804 and 806 in FIG. 8). The CG system searches the text for emoticons, which are a series of characters that represent emotions. The CG system maintains a list of emoticons along with their associated gestures and expressions. For example, the emoticon ":-)" indicates being happy and the emoticon ":-(" indicates being sad. Upon finding these emoticons, the CG system modifies the expression of the character to indicate happiness or sadness, respectively. Moreover, the CG system maintains a list of predefined acronyms along with associated gestures and expressions. The CG system searches the text for these acronyms, and upon finding these, the CG system displays the character with the associated gestures and expressions. For example, the acronym LOL stands for laughing out loud. Upon finding this acronym in the text, the CG system generates the character with an expression indicating the character is laughing. In addition, the acronym IMHO stands for in my humble opinion. Upon finding this acronym, the CG system generates the character with the gesture of pointing to itself. The CG system also determines that text that is capitalized indicates shouting, and generates the character with an expression indicating the character is shouting. In addition, the CG system recognizes certain predefined greetings, including "hello" and "good-bye." The CG system also maintains a list of these greetings along with associated gestures and expressions. Upon finding a greeting, such as "hello," in the text, the CG system generates the character with an associated gesture, such as one of waving. Moreover, the CG system searches the text for pronouns, such as to "I" and "you." When the text references the character (i.e., includes "I"), the CG system generates the character with the gesture of pointing to itself. When the text references another character, the CG system generates the character with the gesture of pointing to another.

When the CG system finds multiple indicators of gestures and expressions, the CG system attempts to draw each of them. For example, the text "I can't make it :-(." results in a character with the gesture of pointing to itself and an expression of frowning. Also, the emoticon ":-(" results in an expression indicating sadness with a gesture of hunched shoulders. When the CG system determines there is a conflict between multiple gestures or expressions, the CG system determines which ones to use based on a predefined priority scheme (i.e., the priority scheme has been defined by the developers of the comic generation system). One skilled in the art will recognize that alternate priority schemes may be used. For example, the emoticon ":-(," has a low priority for a gesture indicating sadness (e.g., hunched shoulders), while the text "good-bye" has high priority for a gesture of waving. Therefore, if the text contains "good-bye :-(," the CG system displays a character with a gesture of waving instead of with a gesture of hunched shoulders.

Gestures and expressions often represent emotions. Each emotion ranges from neutral (i.e., no emotion) to very strong. For example, a character can be angry, and shown with an expression indicating the character is shouting, or very angry, and shown with an expression indicating the character is shouting along with a gesture of waving a fist. When no expressions or gestures are indicated by the text, the CG system selects a neutral expression and a neutral gesture. The CG system has multiple neutral expressions and gestures for each emotion. In order to increase the variety in the comic panels, the CG system cycles through its list of neutral expressions and gestures. Moreover, for a particular emotion represented by a gesture or expression, different characters may have different gestures or expressions. For example, a male character saying "hello" may be shown with a gesture of waving, and a female character saying "hello" may be shown with a gesture of curtseying.

Once the CG system has determined which characters will be included in the comic panel, the CG system determines the position of each character in the comic panel as well as the orientation of each character (see steps 808 and 810 in FIG. 8). In particular, the CG system positions characters who are speaking to each other near each other in a comic panel. The CG system also attempts to position characters so that the fewest number of characters are moved to a new position relative to their position in the last generated comic panel. Also, the CG system determines which characters are speaking to each other by searching the text for names of characters. The user can select a character to address by selecting the character with an input device 104, such as a mouse. If it is not clear that the text is addressed to a particular character, the CG system interprets the text as a comment to all of the other characters. The CG system positions the characters by positioning each character, then positioning each other character without moving any character that has already been positioned. Furthermore, the CG system determines the orientation of each character based on which characters are speaking to each other. The CG system maintains a list of characters and to whom that character is speaking, to determine the position and the orientation of each character. The CG system flips bits in the bitmap of the character to provide a different orientation. For example, comic panel 470 of FIG. 4 shows that the characters speaking to each other are positioned by each other and are oriented relative to each other ("face each other").

Figure 10:
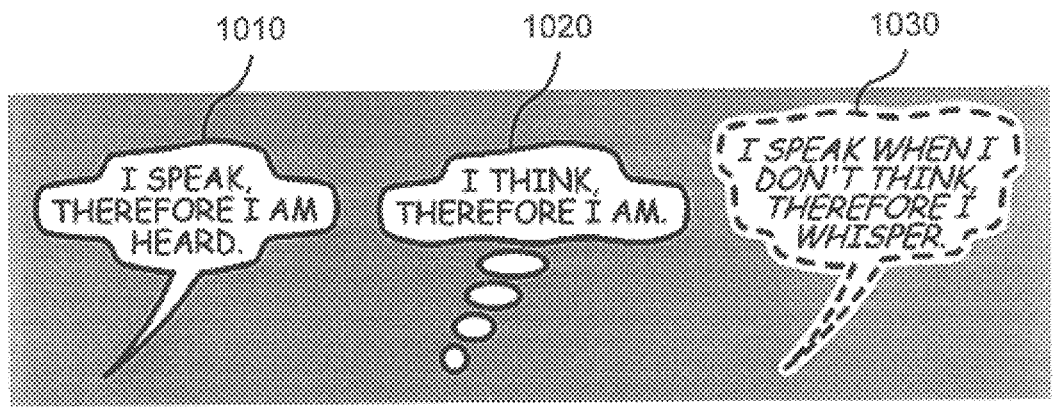
FIG. 10 illustrates sample balloons.

The CG system also places balloons in the comic panel (step 606). The CG system displays the text "spoken" by the characters in balloons. FIG. 10 illustrates sample balloons. There are different types of balloons, including speech balloons, thought balloons, and whisper balloons. One skilled in the art will recognize that other types of balloons, such as shout balloons, can be used. Each balloon has a balloon body that contains the text and a balloon tail that is used to identify the character speaking the text. Each of the types of balloons have different balloon outlines that identify the type of the balloon. A speech balloon 1010 contains typical speech. The balloon outline of the speech balloon is solid, with the balloon body containing the text, while the balloon tail is attached to the balloon body. A thought balloon 1020 indicates that a character is thinking. The thought balloon has a solid balloon outline, with the balloon body containing text, and the balloon tail consisting of a series of increasingly larger ovals. A whisper balloon 1030 indicates a character is whispering. The whisper balloon has a dashed outline for the balloon body and the balloon tail, and its text is italicized. A whisper balloon indicates that the user wishes to transmit the text to only particular other users. The CG system enables a user to identify the users who are to receive the text.

Figure 11:
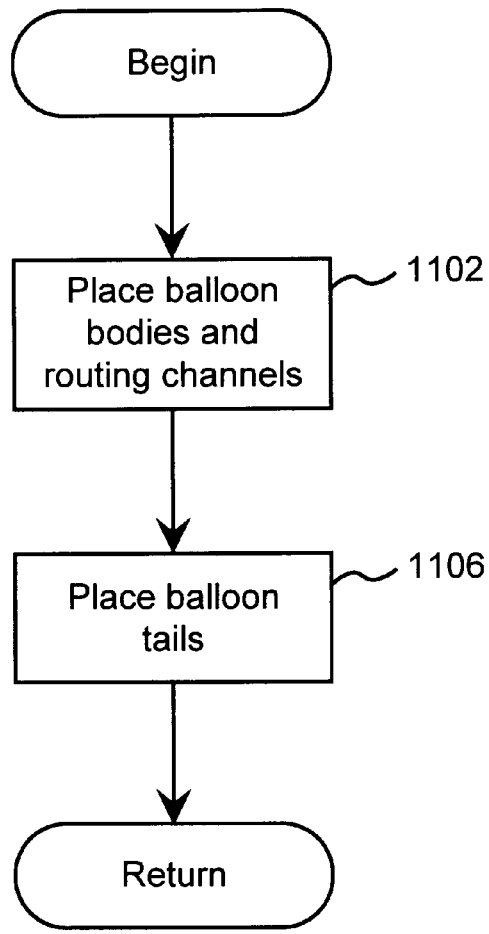
FIG. 11 is a flowchart illustrating the steps performed to place balloons in the comic panel.

FIG. 11 is a flowchart illustrating the steps performed to place balloons in the comic panel. First, the CG system places the balloon bodies and routing channels (step 1102). The routing channel is the width of space in which the balloon tail can be placed without overlapping any other balloon tail or balloon body. Next, the CG system places the balloon tails in the comic panel (step 1106). These steps will now be described in more detail below.

The CG system places a balloon body so that part of it is centered over a character. Also, all balloon bodies in a comic panel are placed above the tallest character. Moreover, because the relative placement of balloons determines the reading order, the CG system places the balloons so that the user viewing the comic panel can read the balloons in the order in which the characters spoke. In particular, balloons are read in a top-down order, and when multiple balloons are at the same height, they are read from left to right (i.e., they are read in a spoken order). The order in which balloons are read is independent of where characters are placed in the panel.

Figure 12:
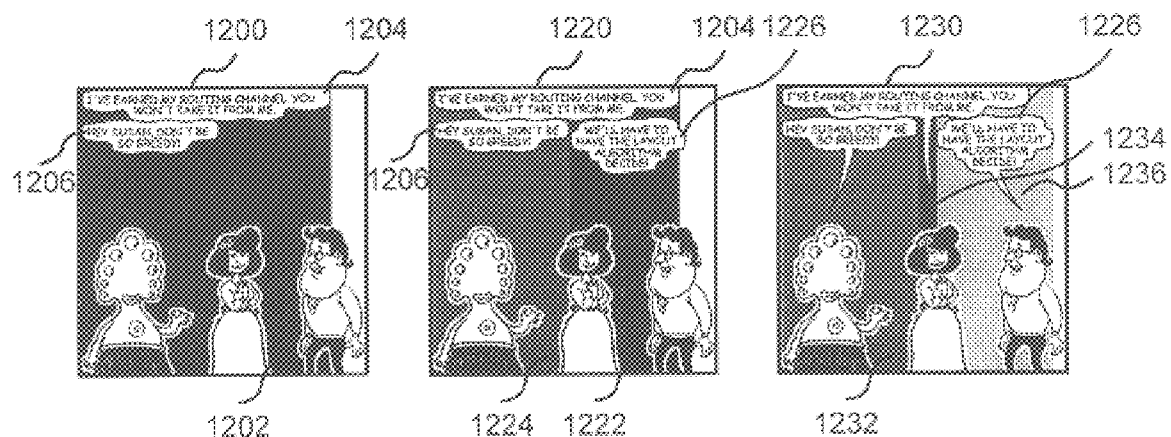
FIG. 12 provides comic panels that illustrate routing channels.

Once a balloon body has been placed, it is not moved. Once each character's balloon body has been placed, the CG system places the balloon tails. Each balloon tail is placed in a routing channel, which is an area in which a particular balloon tail is placed. A routing channel cannot overlap any other routing channel. FIG. 12 provides comic panels that illustrate routing channels. For example, in FIG. 12, comic panel 1200 illustrates one routing channels 1202. Initially, a routing channel 1202 is allocated for one character's balloon body 1204. Then, when placing the next character's balloon body 1206, the CG system determines a routing channel 1224 that decreases the size of the routing channel 1202 to be the size of routing channel 1222 for balloon body 1204. When a routing channel of one character's balloon body is encompassed by another character's balloon body, such as with routing channel 1222 and balloon body 1226, the CG system repositions the balloon body so that it does not encompass the routing channel. Then, the CG system redetermines the routing channels and places the balloon tails in the comic panel. For example, in comic panel 1230, balloon body 1226 has been repositioned, routing channel 1222 has decreased in size to become routing channel 1234, and routing channel 1236 has been added for balloon body 1226.

Sample pseudo code is provided below to show the steps performed to determine the placement of the balloon bodies. In the pseudo code, the variable $B=(B_1, \ldots, B_n)$ represents an array of balloons ordered according to the order in which the text the balloons contain were spoken. In addition, the variable $R=(R_1 \ldots R_n)$ represents a corresponding array of routing channels, with the width of each routing channel $R_i$ defined by left and right endpoints $R_i.l$ and $R_i.r$. The display screen typically is represented in (X,Y) coordinates, with the top, left corner of the display screen having the coordinates (0,0). The X-coordinate of the center of a character's head is represented by $x_i$. The following PlaceBalloons function computes the horizontal placement for an array of n balloons, and sets up the routing channels $R_1 \ldots R_n$. It returns the number of balloons that are placed successfully.

```
Function PlaceBalloons(B,R,x,T)
    for j = 1 to n do
        wj := FindWidth(Bj);
        Rj := [xj-wj, xj+wj]
        for i = 1 to j-1 do:
            Rj := MaxAllowable (Ri, xi, Rj, xj);
        end for
        if width (Rj) >= wj then
            Rj := Position (Bj, Rj)
        else
            if !SqueezeBalloon (Rj, Tj) then
                return j-1;
            end if
        end if
        for i=1 to j-1 do
            Ri := ReduceChannel (Ri, xi, Rj, xj)
        end for
    end for
    return n
end Function
```

The PlaceBalloons function selects each balloon, placing each selected balloon in a comic panel. For example, after placing several balloons, to place a new balloon, the PlaceBalloons function selects a target width for the new balloon by invoking the FindWidth function. The target width is at least as wide as the widest word. Also, the target width ranges from the width of the balloon body when text is placed in the balloon body in as few lines as possible, given the width of the comic panel, to the width of the balloon body when text is placed in the balloon body in as many lines as possible, given vertical space that remains for new balloon bodies in the comic panel. Then, for a particular balloon body, the PlaceBalloons function selects a routing channel that encompasses the width of the balloon body. The PlaceBalloons function invokes the MaxAllowable function which examines the width and position of each previously placed routing channel to determine an allowable width and position of this new balloon's routing channel. If the width of the available routing channel is greater than the width of the balloon body, then the PlaceBalloons function invokes the Position function to shift the balloon body over to fit within the routing channel, while ensuring that the balloon body remains at least partially above the head portion of its character. If the width of the routing channel is smaller than the width of the balloon body, then the balloon body is reduced by the SqueezeBalloon function, which is invoked by the PlaceBalloons function, to the maximum allowable width of its routing channel and placed in this routing channel. Next, for each balloon previously placed, the PlaceBalloon function invokes the ReduceChannel function to decrease the width of that balloon's routing channel by removing any part of the routing channel that intersects the new balloon body's routing channel. The width and horizontal position of the new balloon body is set to be the width and horizontal position of the new balloon's routing channel.

After using the above pseudo code to determine the horizontal position of balloons, the CG system determines the vertical placement of balloons. In particular, each balloon can be placed vertically so that is no higher than the bottom of any balloons already placed to its right, and no higher than the top of any balloons already placed to its left.

After placing balloon bodies based on the vertical and horizontal placement determinations, the CG system position's the balloon tails in the routing channels. The CG system places the balloon tails so that the bottom of each tail is at the same height in the comic panel as the bottom of each other tail. Also, all of the balloon tails have bottoms lower than the bottom of the lowest placed balloon body. Also, the CG system uses routing channels to ensure that balloon tails do not overlap other balloon tails or balloon bodies. The CG system positions the balloon tails to identify the character who is speaking the text within the balloon.

Next, the CG system selects a camera zoom (step 608). A camera zoom indicates how distant the characters in the comic panel appear to a user viewing the comic panel. For example, the characters in comic panel 460 appear more distant than the characters in comic panel 470 of FIG. 4. The CG system selects a camera zoom that shows each of the displayed characters. Also, the CG system does not select a camera zoom that would display a character cut at the neck or ankles. The camera zoom does not affect balloons. Additionally, the CG system selects a comic panel frame (step 610). The comic panel frame is a border around the comic panel, such as panel frame 422 of FIG. 4.

Because a user participating in a session may leave the session and return at a later time, the CG system provides a graphical history of each session. That is, the CG system stores the comic panels that are generated for a session. Then, the CG system enables a user to display the series of comic panels, ordered sequentially by time, on a display screen. The CG system enables the user to scroll through the displayed comic panels. For example, the user interface illustrated in FIG. 4 includes a scroll bar 480 for scrolling through the comic panels in display area 410. That is, the CG system provides a graphical history of a session. Moreover, a user about to participate in a session may also find it helpful to review the graphical history to determine whether to participate in a particular session.

Although the present invention has been described in terms of the preferred embodiment, it is not intended that the invention be limited to this embodiment. Modification within the spirit of the invention will be apparent to those skilled in the art. For example, the CG system could provide transitions between backgrounds, such as from inside a house to a swimming pool in a yard. The CG system could then transition from one background to another. Also, the CG system could display characters performing various activities, such as drinking tea in a house or swimming in the pool. Moreover, a comic panel can be generated without including a character. The scope of the present invention is defined by the claims which follow.

What is claimed is:

1. In a network including a plurality of data processing systems each having an associated display device, a method comprising:

(a) receiving at each of the data processing systems an interaction event generated by any of the data processing systems;

(b) automatically generating a comic panel based on the received interaction event, the comic panel providing a graphical representation of an instance in time of a sequential course of events;

(c) displaying the generated comic panel on each of the display devices associated with the data processing systems;

(d) when an input associated with a graphical representation of a character is received, automatically generating a balloon that includes text that corresponds to the received input associated with the character and automatically generating a tail that is positioned between a position of the balloon and another position for the graphical representation of the character in a current comic panel, the balloon, tail and graphical representation of the character being automatically disposed at positions that are non-overlapping of any other positions for balloons, tails and graphical representations of characters that were previously positioned for display in the current comic panel; and (e) when the input associated with the character is received and non-overlapping positions for displaying the balloon, tail and graphical representation of the character in the current comic panels are unavailable, automatically displaying a new comic panel that includes the balloon, tail and graphical representation of the character, wherein the balloon, tail and graphical representation of the character are disposed at separate positions that are non-overlapping in the display of the new comic panel.

2. The method of claim 1, wherein automatically generating each comic panel further comprises automatically generating each comic panel based upon a last generated comic panel.

3. The method of claim 1, wherein each of the data processing systems includes a plurality of comic panels and a scroll bar displayed on its associated display device for scrolling through the plurality of comic panels, the scroll bar including a scroll box, the scroll box having a position in the scroll bar, the position corresponding to one of the plurality of comic panels, further comprising displaying the plurality of comic panels based on the position of the scroll box in the scroll bar.

4. The method of claim 1, wherein each character has a body portion with at least one body feature and wherein the interaction event provides a gesture indicating a modification of a body feature of one of the characters.

5. The method of claim 1, wherein each character has a head portion with at least one facial feature and wherein the interaction event provides an expression indicating a modification of a facial feature of one of the characters.

6. The method of claim 1, wherein the interaction event provides a modification of a semantic element.

7. In a first data processing system having a display device, the first data processing system being coupled to at least one additional data processing system having an additional display device, a method, comprising:

(a) providing a plurality of comic panels, the plurality of comic panels representing a sequential course of events, each of the comic panels providing a graphical representation of an instance in time of the sequential course of events, each graphical representation including a graphical representation of at least one character;

(b) receiving an interaction event from any one of the first and additional data processing systems, the interaction event indicating a modification of a comic panel;

(c) automatically generating at each of the first and additional data processing systems the comic panel reflecting the interaction event;

(d) displaying the generated comic panel on each display device of each data processing system;

(e) when an input associated with a character is received, automatically generating a balloon that includes text that corresponds to the received input associated with the character and generating a tail that is positioned between a position of the balloon and another position for the graphical representation of the character in a current comic panel, the balloon, tail and graphical representation of the character being automatically disposed at positions that are non-overlapping of any other positions for balloons, tails and graphical representations of characters that were previously positioned for display in the current comic panel; and (f) when the input associated with the character is received and non-overlapping positions for displaying the balloon, tail and graphical representation of the character in the current comic panel are unavailable, automatically displaying a new comic panel that includes the balloon, tail and graphical representation of the character, wherein the balloon, tail and graphical representation of the character are disposed at separate positions that are non-overlapping in the display of the new comic panel.

8. The method of claim 1, wherein providing a plurality of comic panels further comprises displaying the plurality of comic panels on each display device.

9. The method of claim 2, wherein each data process system is enabled to provide a scroll bar displayed on the display device for scrolling through the plurality of comic panels, the scroll bar including a scroll box, the scroll box having a position in the scroll bar, the position corresponding to one of the plurality of comic panels, and wherein displaying the plurality of comic panels displays a plurality of comic panels based on the position of the scroll box in the scroll bar.

10. The method of claim 1, wherein generating a comic panel further comprises:

(a) determining whether to generate a new comic panel that reflects the interaction event;

(b) when the determination to generate the new comic panel is affirmative, generating the new comic panel incorporating the modification indicated by the interaction event; and (c) when the determination to generate the new comic panel is negative, incorporating the modification indicated by the interaction event into a last generated comic panel in the plurality of comic panels.

11. The method of claim 1, wherein each character has a body portion with at least one body feature and wherein the interaction event provides a gesture indicating a modification of a body feature of at least one of the characters.

12. The method of claim 1, wherein each character has a head portion with at least one facial feature and wherein the interaction event provides an expression indicating a modification of a facial feature of at least one of the characters.

13. The method of claim 1, wherein the comic panel includes at least one semantic element and wherein the interaction event provides a modification of a semantic element.

14. The method of claim 1, wherein automatically generating at the data processing systems the comic panel reflecting the interaction event further comprises automatically generating a plurality of comic panels reflecting the interaction event.

15. In a data processing system that is coupled to at least one other data processing system, wherein each of the data processing systems includes an associated display, a method comprising:

(a) providing at least one comic panel, each comic panel providing a graphical representation of an instance in time of a sequential course of events, each graphical representation including a graphical representation of at least one character, each character being adapted to represent a user of one of the data processing systems;

(b) displaying a current comic panel on each of the display devices, the current comic panel representing a most recent event relative to each other event in the sequential course of events;

(c) receiving an interaction event from any of the data processing systems, the interaction event indicating a modification of at least one comic panel;

(d) after receiving the interaction event from any one of the data processing systems, performing actions including:

(i) determining when a new comic panel incorporating the modification indicated by the interaction event is to be generated;

(ii) when the determination to generate the new comic panel is affirmative, generating the new comic panel incorporating the modification indicated by the interaction event; and (iii) when the determination to generate the new comic panel is negative, modifying the current comic panel to incorporate the modification indicated by the interaction event; and (e) displaying on each display associated with the data processing systems the comic panel incorporating the modification indicated by the interaction event;

(f) when an input associated with a character is received, automatically generating a balloon that includes text that corresponds to the received input associated with the character and automatically generating a tail that is positioned between a position of the balloon and another position for the graphical representation of the character in the current comic panel, the balloon, tail and graphical representation of the character being automatically disposed at positions that are non-overlapping of any other positions for balloons, tails and graphical representations of characters that were previously positioned for display in the current comic panel; and (g) when the input associated with the character is received and non-overlapping positions for displaying the balloon, tail and graphical representation of the character in the current comic panel are unavailable, automatically generating the new comic panel that includes the balloon, tail and graphical representation of the character, wherein the balloon, tail and graphical representation of the character are disposed at separate positions that are non-overlapping in the display of the new comic panel.

16. The method of claim 9, wherein displaying the current comic panel further comprises displaying a predetermined number of a plurality of comic panels including the current comic panel.

17. The method of claim 10, wherein each of the data processing systems includes a scroll bar displayed on its associated display device for scrolling through the plurality of comic panels, the scroll bar including a scroll box, the scroll box having a position in the scroll bar, the position corresponding to one of the plurality of comic panels, and wherein displaying the predetermined number of the plurality of comic panels displays the predetermined number of the plurality of comic panels based on the position of the scroll box in the scroll bar.

18. In a data processing system having a display, a method comprising:
   (a) determining that a new comic panel is to be generated, the comic panel providing a graphical representation of an instance in time of a sequential course of events, each graphical representation including a graphical representation of at least one character, the comic panel thereby being capable of containing a plurality of characters; and
   (b) upon determining that the new comic panel is to be generated, performing actions, including:
      (i) determining each character to display in the new comic panel;
      (ii) determining a placement for each character in the new comic panel, the placement indicating a sequential position of a character relative to each other character in the comic panel;
      (iii) determining an orientation for each character relative to each other character in the new comic panel;
      (iv) generating the new comic panel;
      (v) displaying the generated new comic panel on the display device at the data processing system;
      (vi) when an input associated with a character is received, automatically generating a balloon that includes text that corresponds to the received input associated with the character and automatically generating a tail that is positioned between a position of the balloon and another position for the graphical representation of the character in a current comic panel, the balloon, tail and graphical representation of the character being automatically disposed at positions that are non-overlapping of any other positions for balloons, tails and graphical representations of characters that were previously positioned for display in the current comic panel; and
      (vii) when the input associated with the character is received and non-overlapping positions for displaying the balloon, tail and graphical representation of the character in the current comic panel are unavailable, automatically displaying the new comic panel that includes the balloon, tail and graphical representation of the character, wherein the balloon, tail and graphical representation of the character are disposed at separate positions that are non-overlapping in the display of the new comic panel.

19. The method of claim 12, wherein each character has a body portion with at least one body feature, further comprising, after determining which of the characters to display in the new comic panel, performing actions, including:
   (a) determining when a gesture indicating a modification of a body feature of a character is to be displayed in the new comic panel; and (b) when the determination is affirmative, generating the modification of the body feature based on the gesture for display in the new comic panel.

20. The method of claim 12, wherein each character has a head portion with at least one facial feature, further comprising, after determining each character to display in the new comic panel, performing actions, including:
   (a) determining when an expression indicating a modification of a facial feature of the character is to be displayed in the new comic panel; and
   (b) when the determination is affirmative, generating the modification of the body feature based on the facial feature for display in the new comic panel.

21. The method of claim 12, wherein determining the placement for each character in the new comic panel further comprises determining the placement for each character in the new comic panel based upon the disposition of each character that is communicating in the new comic panel.

22. The method of claim 12, including a prior generated comic panel and wherein determining the placement for each character further comprises determining the placement for each character based upon that character's position in the prior generated comic panel.

23. The method of claim 12, wherein determining the orientation for each character further comprises determining the orientation for each character based upon the disposition of each character that is communicating in the new comic panel.

24. The method of claim 12, further comprising, determining a background of the comic panel based upon the interaction event.

25. The method of claim 12, further comprising selecting a camera zoom for the comic panel, the camera zoom indicating the size of the characters in the comic panel.

26. The method of claim 19, further comprising selecting a panel frame for the comic panel.

27. In a data processing system having a display, a method comprising:
   (a) providing a comic panel that provides a graphical representation of an instance in time of a sequential course of events, the graphical representation including a graphical representation of at least one character, the comic panel thereby being capable of containing more than one character; and
   (b) when textual input for a character is received, performing actions, including:
      (i) placing the received textual input within a balloon having a balloon outline, the balloon outline including a balloon body containing the textual input and a balloon tail indicating the character to which the textual input corresponds;
      (ii) automatically determining a position of the balloon containing the textual input and another position of the balloon tail in the comic panel, the position of the balloon and the other position of the balloon tail being non-overlapping of the display of any other balloons, balloon tails and graphical representations of characters already positioned in the comic panel, and
      automatically displaying the balloon containing the textual input and the balloon tail in the comic panel at non-overlapping positions; and
      (iii) when non-overlapping positions for displaying the balloon and the balloon tail in the comic panel are unavailable, automatically displaying a new comic panel that includes the balloon, tail and graphical representation of the character, wherein the balloon, tail and graphical representation of the character are disposed at separate positions that are non-overlapping in the display of the new comic panel.

28. The method of claim 21, wherein providing the comic panel provides a plurality of comic panels.

29. The method of claim 21, wherein the balloon outline indicates a type of textual input received, the type of textual input indicating a manner in which the textual input is to be displayed.

30. The method of claim 21, including providing the comic panel having a plurality of balloon bodies and wherein determining the position of the balloon further comprises determining a position of a balloon body of the balloon so that each balloon body in the comic panel is displayed in an order that the textual input for each character is received.

31. In a network including a plurality of data processing systems each having an associated display device, a method comprising:

(a) providing a plurality of comic panels, the plurality of comic panels representing a sequential course of events, each of the comic panels providing a graphical representation of an instance in time of the sequential course of events, each graphical representation including a graphical representation of at least one character;

(b) providing a scroll bar displayed on the display device for scrolling through the plurality of comic panels, the scroll bar including a scroll box, the scroll box having a position in the scroll bar, the position corresponding to one of the plurality of comic panels;

(c) displaying a current comic panel on each of the display devices, the current comic panel representing a most recent event relative to each other event in the sequential course of events, the scroll box on the scroll bar having a current position corresponding to the current comic panel;

(d) receiving an indication to reposition the scroll box on the scroll bar;

(e) displaying the comic panel different from the previous current comic panel on each of the display devices after receiving the indication to reposition the scroll box in the scroll bar;

(f) when an input associated with a character is received, automatically generating a balloon that includes text that corresponds to the received input associated with the character and automatically generating a tail that is positioned between a position of the balloon and another position for the graphical representation of the character in the current comic panel, the balloon, tail and graphical representation of the character being automatically disposed at positions that are non-overlapping of any other positions for balloons, tails and graphical representations of characters that were previously positioned for display in the current comic panel; and (g) when the input associated with the character is received and non-overlapping positions for displaying the balloon, tail and graphical representation of the character in the current comic panel are unavailable, automatically displaying a new comic panel that includes the balloon, tail and graphical representation of the character, wherein the balloon, tail and graphical representation of the character are disposed at separate positions that are non-overlapping in the display of the new comic panel.

32. The method of claim 25, wherein displaying the current comic panel, further comprises displaying a plurality of comic panels, including the current comic panel, and wherein displaying the comic panel different from the previous current comic panel, further includes displaying the plurality of comic panels different from a predetermined number of the previously displayed plurality of comic panels.

33. A first data processing system connected to a second data processing system, comprising:

(a) first display device associated with the first data processing system;

(b) a second display device associated with the second data processing system;

(c) a comic generation system coupled to the first and second data processing systems for generating comic panels, each comic panel providing a graphical representation of an instance in time of a sequential course of events, each graphical representation including a graphical representation of at least one character, each character being adapted to represent a user of one of the data processing systems, the comic generation system comprising:

(i) a receiver for receiving an interaction event from any one of the data processing systems indicating a modification of a comic panel;

(ii) a generator for generating a new comic panel incorporating the interaction event received by the receiver;

(iii) a displayer for displaying the new comic panel generated by the generator on the first and second displays of the first and second data processing systems; and (iv) an engine for performing logical actions, comprising:

(A) when the engine determines that an input associated with a character is received, causing the generator to automatically generate a balloon that includes text that corresponds to the received input associated with the character and to automatically generate a tail that is positioned between a position of the balloon and another position for the graphical representation of the character in a current comic panel, the balloon, tail and graphical representation of the character being automatically displayed by the displayer at positions that are non-overlapping of any other positions for balloons, tails and graphical representations of characters that were previously positioned for display in the current comic panel; and (B) when the engine determines that the input associated with the character is received and non-overlapping positions for displaying the balloon, tail and graphical representation of the character in the current comic panel are unavailable, employing the generator to automatically generate the new comic panel that includes the balloon, tail and graphical representation of the character, wherein the balloon, tail and graphical representation of the character are disposed at separate positions that are non-overlapping in the display of the new comic panel.

34. In a data processing system having a display device, a server application program, and a client application program, a method comprising:

(a) receiving at the server application program an interaction event from the client application program;

(b) automatically generating with the server application program a comic panel based on the received interaction event, the comic panel providing a graphical representation an instance in time of a sequential course of events, the graphical representation including at least one graphical representation of a character;

(c) forwarding from the server application program to the client application program the generated comic panel;

(d) when an input associated with a graphical representation of a character is received by the client program, employing the server program to automatically generate a balloon that includes text that corresponds to the received input associated with the character and to automatically generate a tail that is positioned between a position of the balloon and another position for the graphical representation of the character in a current comic panel, the balloon, tail and graphical representation of the character being automatically disposed by the client program at positions that are non-overlapping of any other positions for balloons, tails and graphical representations of characters that were previously positioned for display in the current comic panel; and (e) when the input associated with the character is received by the client program and non-overlapping positions for displaying the balloon, tail and graphical representation of the character in the current comic panel are unavailable, employing the server program to automatically generate the new comic panel that includes the balloon, tail and graphical representation of the character, wherein the balloon, tail and graphical representation of the character are disposed by the client program at separate positions that are non-overlapping in the display of the new comic panel.

35. The method of claim 34, wherein the data processing system includes a memory for storing a plurality of comic panels and a scroll bar displayed on the display device for scrolling through the plurality of comic panels, the scroll bar including a scroll box, the scroll box having a position in the scroll bar, the position corresponding to one of the plurality of comic panels, and wherein the server application program displays a plurality of comic panels based on the position of the scroll box in the scroll bar upon request by the client application program.

36. In a data processing system having a display device, a server application program, and a client application program, the data processing system being coupled to least one other data processing system, each coupled data processing system having a client application program, a method comprising:

(a) under control of the client application program, performing actions, including:
  (i) receiving an interaction event;
  (ii) generating a comic panel, the comic panel providing a graphical representation of an instance in time of a sequential course of events, each graphical representation including a graphical representation of at least one character;
  (iii) displaying the generated comic panel at the data processing system; and
  (iv) forwarding the received interaction event to the server application program; and (b) under control of the server application program, performing actions, including:
  (i) receiving the forwarded interaction event from the client application program;
  (ii) forwarding the received interaction event to each other client application program at each connected data processing system;
  (iii) when an input associated with a character is received by the client application program, automatically generating a balloon that includes text that corresponds to the received input associated with the character and automatically generating a tail that is positioned between a position of the balloon and another position for the graphical representation of the character displayed by the client application program in a current comic panel, the balloon, tail and graphical representation of the character being automatically disposed at positions that are non-overlapping of any other positions for balloons, tails and graphical representations of characters that were previously positioned for display by the client application program in the current comic panel; and
  (vi) when the input associated with the character is received by the client application program and non-overlapping positions for displaying the balloon, tail and graphical representation of the character in the current comic panel are unavailable, having the client application program automatically display a new comic panel that includes the balloon, tail and graphical representation of the character, wherein the balloon, tail and graphical representation of the character are disposed at separate positions that are non-overlapping in the display of the new comic panel.

37. The method of claim 36, wherein under control of each client application program at each coupled data processing system, further comprising:

(a) receiving the forwarded interaction event from the server application program;

(b) generating the comic panel, the comic panel providing a graphical representation of an instance in time of a sequential course of events, each graphical representation of the instance in time including the graphical representation of at least one character; and (c) displaying the generated comic panel at each data processing system.

38. A computer-readable storage medium, upon which is stored a comic generation program for automatically generating comic panels among a plurality of data processing systems, the comic generation program performing actions, comprising:

(a) displaying at least one comic panel, each comic panel providing a graphical representation of an instance in time of a sequential course of events;

(b) receiving an interaction event from any of the data processing systems indicating a modification of one of the comic panels;

(c) generating a comic panel based on the received interaction event;

(d) displaying the generated comic panel on a display device;

(e) when an input associated with a graphical representation of a character is received, automatically generating a balloon that includes text that corresponds to the received input associated with the character and automatically generating a tail that is positioned between a position of the balloon and another position for the graphical representation of the character in a current comic panel, the balloon, tail and graphical representation of the character being automatically disposed at positions that are non-overlapping of any other positions for balloons, tails and graphical representation of characters that were previously positioned for display in the current comic panel; and (f) when the input associated with the character is received and non-overlapping positions for displaying the balloon, tail and graphical representation of the character in the current comic panel are unavailable, automatically displaying a new comic panel that includes the balloon, tail and graphical representation of the character, wherein the balloon, tail and graphical representation of the character are disposed at separate positions that are non-overlapping in the display of the new comic panel.

* * * * *

UNITED STATES PATENT AND TRADEMARK OFFICE
CERTIFICATE OF CORRECTION

PATENT NO.   : 6,069,622
DATED        : May 30, 2000
INVENTOR(S)  : D.J. Kurlander It is certified that error appears in the above-identified patent and that said Letters Patent is hereby corrected as shown below:

Title page,
Item [56], References Cited, "Tarbella" should read -- Tarabella --
OTHER PUBLICATIONS, insert in appropriate order the following: -- iComix! Hurst, Mark, Mar. 6, 1996, 9 Web pages. http://fishwrap-comics.www.media.mit.edu/cgi-bin/home.pg --
OTHER PUBLICATIONS, after "*Do*" insert -- : --
Attorney, Agent or Firm, after "Christensen" delete ","

Column 1,
Line 64, before "character" delete "("

Column 4,
Line 40, "during or" should read -- during a --
Line 66, after "comic panels" insert -- , --

Column 5,
Line 64, "orientation," should read -- orientations --

Column 6,
Line 18, "system 208." should read -- system 118. --
Line 19, "description 118" should read -- description 208 --

Column 7,
Line 4, "i user" should read -- a user --

Column 10,
Line 10, delete "to"

Column 11,
Line 62, "channels" should read -- channel --

Column 12,
Line 15, "were" should read -- was --

UNITED STATES PATENT AND TRADEMARK OFFICE
CERTIFICATE OF CORRECTION

PATENT NO. : 6,069,622
DATED : May 30, 2000
INVENTOR(S) : D.J. Kurlander

It is certified that error appears in the above-identified patent and that said Letters Patent is hereby corrected as shown below:

Column 15,
Line 38, "claim 1" should read -- claim 7 --
Line 41, "claim 2" should read -- claim 8 --
Line 50, "claim 1" should read -- claim 7 --
Line 62, "claim 1" should read -- claim 7 --
Line 66, "claim 1" should read -- claim 7 --

Column 16,
Line 3, "claim 1" should read -- claim 7 --
Line 7, "claim 1" should read -- claim 7 --

Column 17,
Line 3, "claim 9" should read -- claim 15 --
Line 7, "claim 10" should read -- claim 16 --
Line 60, "claim 12" should read -- claim 18 --

Column 18,
Line 4, "claim 12" should read -- claim 18 --
Line 14, "claim 12" should read -- claim 18 --
Line 19, "claim 12" should read -- claim 18 --
Line 24, "claim 12" should read -- claim 18 --
Line 29, "claim 12" should read -- claim 18 --
Line 29, after "comprising" delete ","
Line 32, "claim 12" should read -- claim 18 --
Line 35, "claim 19" should read -- claim 25 --
Lines 59-63, the paragraph beginning "automatically displaying the balloon containing" should be part of the previous clause Column 19,
Line 4, "claim 21" should read -- claim 27 --
Line 6, "claim 21" should read -- claim 27 --
Line 10, "claim 21" should read -- claim 27 --
Line 66, "claim 25" should read -- claim 31 --
Line 37, after "panel" delete ","

UNITED STATES PATENT AND TRADEMARK OFFICE
CERTIFICATE OF CORRECTION

PATENT NO. : 6,069,622
DATED : May 30, 2000
INVENTOR(S) : D.J. Kurlander

It is certified that error appears in the above-identified patent and that said Letters Patent is hereby corrected as shown below:

Column 20,
Line 3, after "panel" delete ","

Column 21,
Line 2, after "representation" insert -- of --

Signed and Sealed this

Fifteenth Day of January, 2002

Attest:

JAMES E. ROGAN
*Director of the United States Patent and Trademark Office*

*Attesting Officer*